UNITED STATES PATENT OFFICE.

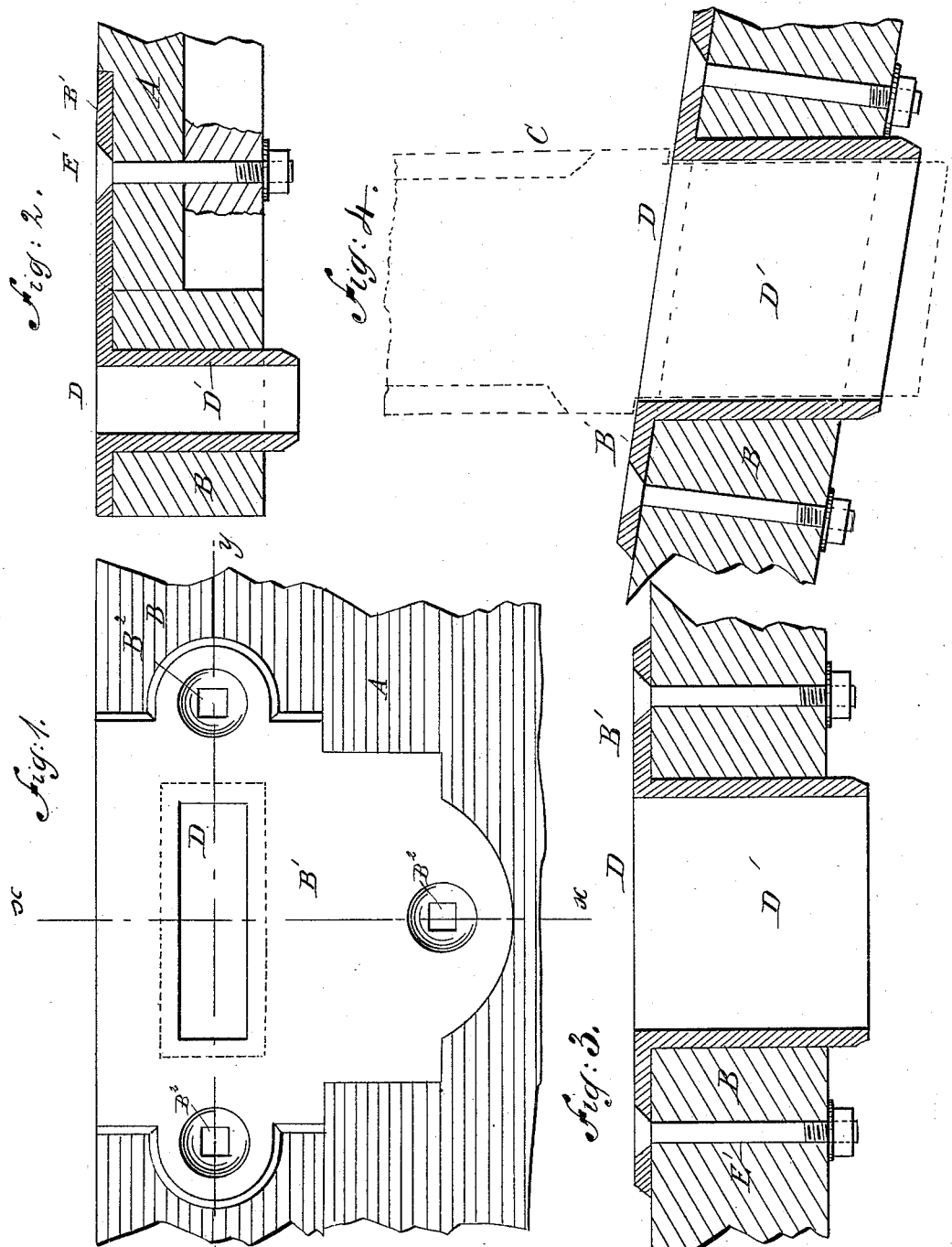

GEORGE HOEPFNER AND HENRY WUEST, OF NEW YORK, N. Y.

RUNG-SOCKET PLATE FOR TRUCKS.

SPECIFICATION forming part of Letters Patent No. 405,474, dated June 18, 1889.

Application filed November 15, 1888. Serial No. 290,916. (No model.)

*To all whom it may concern:*

Be it known that we, GEORGE HOEPFNER and HENRY WUEST, both of the city, county, and State of New York, have invented a new and Improved Combined Rung Plate and Socket, of which the following is a full, clear, and exact description.

Our invention relates to a combined rung plate and socket, and has for its object to provide a device which will at all times retain the rung in a perpendicular position; and the further object of the invention is to provide a device which will strengthen the body-piece and serve to tie the said body-piece to the floor of a truck.

The invention consists in the novel construction and combination of the several parts, as will be hereinafter fully described, and pointed out in the claims.

Reference is to be had to the accompanying drawings, forming a part of this specification, in which similar letters of reference indicate corresponding parts in all the views.

Figure 1 is a plan view of the plate, illustrating the same in position on the body of a truck. Fig. 2 is a transverse section on line $xx$ of Fig. 1. Fig. 3 is a longitudinal section on line $yy$ of Fig. 1; and Fig. 4 is a modified form of the plate, illustrating the same as attached to a wagon-body having a downward inclination.

A represents the bed of a truck, B the body-piece of the same, and C the rung. The device consists of a top plate B', which plate is usually provided with three apertures B², so disposed that one aperture will be at each side and one at the end, as best illustrated in Fig. 1. In the plate B', near the outer edge, a rectangular opening D is produced, which opening is adapted to receive the lower end of the rung C. A socket D' is attached to or cast integral with the bottom of the plate B', which socket is made to surround the opening D, and is of like contour and size.

When the plate is to be used upon a truck having a straight body, the socket D' is straight—that is, it is made to extend downward at a right angle to the plate; but when the body of the truck is inclined or curved the socket is given an equivalent inclination, as illustrated in Fig. 4, in order that when the rung is inserted in the said socket the said rung will be held in a perpendicular position.

In attaching the device to a truck an aperture is made in the body-piece to receive the socket D', and the said socket is made of such length that it will project a distance downward beyond the bottom of the body-piece, as is best shown in Figs. 2 and 3. The plate B' is made to rest upon the upper surface of the truck-bottom and of the body-piece, as illustrated in Fig. 1, in which it will be observed that one straight edge of the plate B' is flush with the outer surface of the body-piece, and it will be also observed that the said plate extends transversely across the body-piece and a distance across the bottom or bed of the truck. That portion of the plate B' resting upon the bottom or bed of the truck is sunk into the body, while the other portion of the plate simply rests upon the body-piece. The plate is countersunk at its inner end because the bottom or body of the truck usually extends above the body-piece. Thus when the plate is in position the top is in a substantially true horizontal plane. The plate is held in proper position through the medium of bolts E' or equivalent fastening devices.

By reference to the foregoing description and the drawings it will be seen that the socket will retain the rung at all times in a true vertical position, and that it strengthens the body-piece and ties the outside body-piece to the floor, thereby preventing the former from yielding to any strain brought to bear upon the rung. It often happens, when the old form of rung-plate is used, when the truck is heavily loaded and great weight is brought to bear upon the rung, either by the load or rope or chain attached to the rung, that the plate and the body-piece attached thereto are bowed or sprung outward. When this occurs, it is very difficult to repair the damage.

By reason of the socket extending entirely through the body-piece a greater bearing for the lower end of the rung is obtained, and since the socket projects below the body-piece and is only of sufficient size to accommodate the rung the latter is held solidly to place and all lateral movement is prevented. The rung also, when the device is used, sustains comparatively little wear. Since the bottom of the rung is fixedly held in the socket, the outer edges of the rung at the top of the plate have little or no play, and consequently will not be chafed by the said plate. When the ordinary form of rung-plate is used, the rung projects down beyond the aperture in the body-piece, and has consequently considerable play at the bottom, and the edges bearing upon the edge of the top rung-plate are very apt to be very seriously chafed.

Having thus described our invention, we claim as new and desire to secure by Letters Patent—

1. As an improved article of manufacture, a combined rung plate and socket consisting of a horizontal flat plate having a longitudinal aperture produced therein, and a box-like casing surrounding the said aperture and projecting downward from the under face of the plate, substantially as shown and described.

2. As an improved article of manufacture, a combined rung plate and socket consisting of a metallic horizontal plate having one straight end surface and provided with a longitudinal opening at or near the said straight surface, and a box-like casing constituting a socket integral with the under surface of the plate and surrounding the longitudinal opening therein, substantially as and for the purpose specified.

GEORGE HOEPFNER.
HENRY WUEST.

Witnesses:
ADOLPH BLEIBTREU,
AUGUST KLATT.